(12) United States Patent
Zeng et al.

(10) Patent No.: US 8,137,062 B2
(45) Date of Patent: Mar. 20, 2012

(54) TURBOMACHINE NOZZLE

(75) Inventors: Xiaoqiang Zeng, Albany, NY (US); Jonathon Edward Slepski, Clifton Park, NY (US); Alexander Stein, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 200 days.

(21) Appl. No.: 12/777,326

(22) Filed: May 11, 2010

(65) Prior Publication Data
US 2011/0278378 A1 Nov. 17, 2011

(51) Int. Cl.
*F01D 9/04* (2006.01)
(52) U.S. Cl. ...... 415/192; 415/191; 415/193; 415/208.2; 415/209.1; 415/211.2; 29/557; 29/889.2
(58) Field of Classification Search .......... 415/191–193, 415/208.1, 208.2, 209.1, 211.2; 416/223 R, 416/223 A, 238, 242, 243, DIG. 2, DIG. 6; 29/557, 889.2
See application file for complete search history.

(56) References Cited

U.S. PATENT DOCUMENTS

| 5,779,443 A | 7/1998 | Haller et al. | |
|---|---|---|---|
| 2009/0257866 A1* | 10/2009 | Greim et al. | 415/208.1 |

FOREIGN PATENT DOCUMENTS
EP 2075408 A2 7/2009

OTHER PUBLICATIONS

Heinrich Stuer, et al., Aerodynamic Concept for Very Large Steam Turbine Last Stages; Proceedings of GT2005, ASME Turbo Expo 2005; Power for Land, Sea and Air; Jun. 6-9, 2005; Reno-Tahoe, Nevada, USA; pp. 1-15.

* cited by examiner

*Primary Examiner* — Christopher Verdier
(74) *Attorney, Agent, or Firm* — Cantor Colburn LLP

(57) ABSTRACT

A turbomachine includes a housing, and a plurality of turbomachine nozzles. At least one of the plurality of turbomachine nozzles includes a body having a first surface and an opposing second surface that extend between a first end and a second end. At least one of the first and second surfaces includes a profile having an angle of between about 3° and about 8° between a first line passing through the first end and a first position located between about 28% and about 38% from the first end and a second line passing through the first position and a second position located between about 53% and about 63% from the first end, and an angle of between about 10° and about 20° between the second line and a third line passing through the second position and a third position located between about 74% and about 84% from the first end.

20 Claims, 2 Drawing Sheets

TURBOMACHINE NOZZLE

BACKGROUND OF THE INVENTION

The subject matter disclosed herein relates to the art of turbomachines, and, more particularly, to a turbine nozzle for a turbomachine.

Many system requirements must be met for each stage of a hot gas turbine portion of a turbomachine in order to meet design goals that include an overall system efficiency and airfoil loading. Nozzles, particularly for later stages of a steam turbomachine, have a large aspect ratio that creates a large radial pressure variation which results in lower blade efficiency. Enhancing the nozzle profile to achieve higher blade efficiencies leads to energy and cost savings for the turbomachine. Even fractional increases in blade efficiency can lead to significant cost savings.

BRIEF DESCRIPTION OF THE INVENTION

According to one aspect of the invention, a turbomachine includes a housing, and a plurality of turbomachine nozzles mounted within the housing. At least one of the plurality of turbomachine nozzles includes a body having a first surface and an opposing second surface that extend between a first end and a second end. At least one of the first and second surfaces includes a profile having an angle of between about 3° and about 8° between a first line passing through the first end and a first position located between about 28% and about 38% from the first end and a second line passing through the first position and a second position located between about 53% and about 63% from the first end, and an angle of between about 10° and about 20° between the second line and a third line passing through the second position and a third position located between about 74% and about 84% from the first end.

According to another aspect of the invention, a turbomachine nozzle includes a body having a first surface and an opposing second surface that extend between a first end and a second end. At least one of the first and second surfaces includes a profile having an angle of between about 3° and about 8° between a line passing through the first end and a first position located between about 28% and about 38% from the first end and a second line passing through the first position and a second position located between about 53% and about 63% from the first end, and an angle of between about 10° and about 20° between the second line and a third line passing through the second position and a third position located between about 74% and about 84% from the first end.

According to yet another aspect of the invention, a method of forming a turbomachine nozzle includes creating a turbomachine nozzle having a first surface and an opposing second surface that extend between a first end and a second end edge, and shaping one of the first and second surfaces to include a profile having an angle of between about 3° and about 8° between a first line passing through the first end and a first position located between about 28% and about 38% from the first end and a second line passing through the first position and a second position located between about 53% and about 63% from the first end, and an angle of between about 10° and about 20° between the second line and a third line passing through the second position and a third position located between about 74% and about 84% from the first end.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
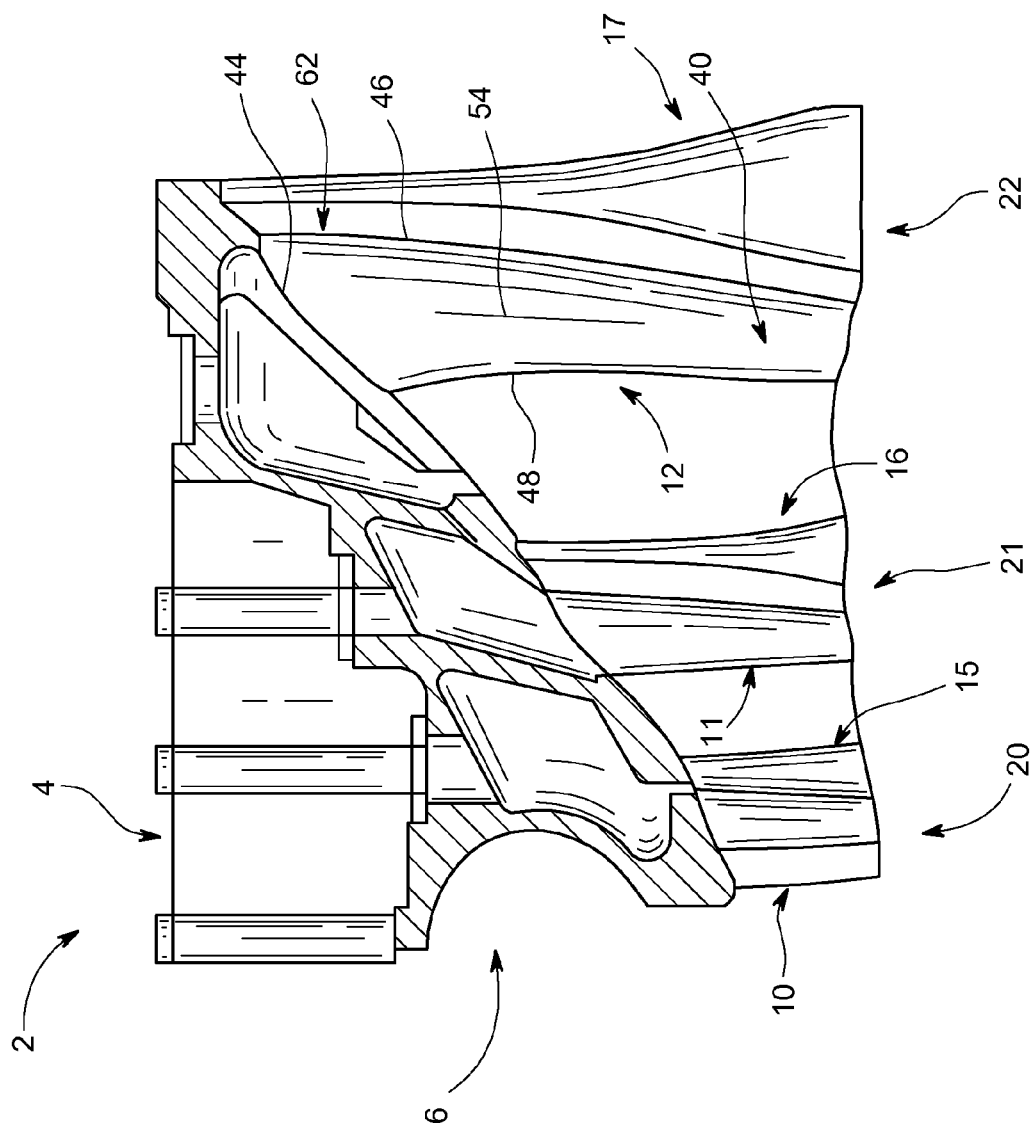
FIG. 1 is a schematic, cross-sectional view of a turbomachine including a turbine nozzle in accordance with an exemplary embodiment.

With reference to FIG. 1, a turbomachine, in accordance with an exemplary embodiment, is indicated generally at 2. Turbomachine 2 includes a housing 4 that defines, at least in part, a turbine section 6. Turbine section 6 includes a plurality of turbine nozzles 10-12 that are positioned adjacent a plurality of turbine blades 15-17. Each turbine nozzle 10-12 and turbine blade 15-17 defines a corresponding turbine stage 20-22. At this point it should be understood that while three stages are shown, turbine section 6 could include additional stages (not shown). Also, while shown with a single turbine nozzle and turbine blade, each stage 20-22 may include a plurality of turbine nozzles and turbine blades. In the exemplary embodiment shown, turbine stage 22 defines a last or end stage of turbine section 6.

Figure 2:
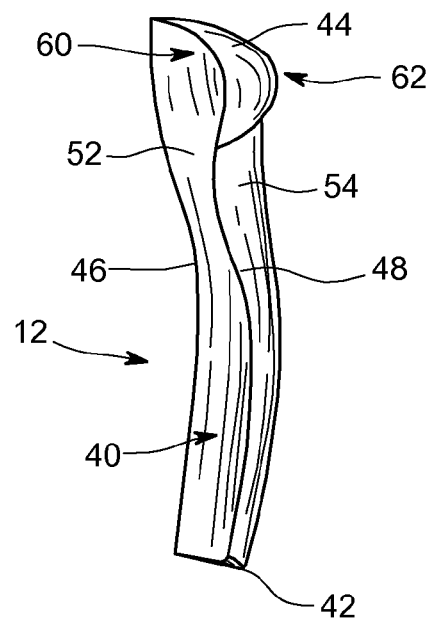
FIG. 2 is a perspective view of the turbine nozzle of FIG. 1.

At this point reference will be made to FIG. 2 in describing turbine nozzle 12. However, it should be understood that the remaining turbine nozzles 10-11 could include similar structure. Moreover, turbomachine 2 could also include a compressor (not shown) having nozzles that are similarly formed. Turbine nozzle 12 includes a body 40 having a first end or root portion 42 that extends along an axial axis to a second end or tip portion 44. Body 40 is also shown to include a trailing edge section 46 that extends along a radial axis to a leading edge section 48. A first or pressure surface 52 extends between the root portion 42 and tip portion 44 and between trailing edge section 46 and leading edge section 48. A second or suction surface 54 similarly extends between root portion 42 and tip portion 44, and between trailing edge section 46 and leading edge section 48. As will be detailed more fully below, first surface 52 is defined by a first profile 60 and second surface 54 is defined by a second profile 62.

In accordance with an exemplary embodiment, first profile 60 can be described by a radial distribution of tangential coordinates along either leading edge section 46 or trailing edge section 48 between root portion 42 and tip portion 44. As will be detailed more fully below, the tangential coordinates extend substantially parallel to a direction of rotation of turbine section 6 and perpendicular to both the axial axis, e.g., an axis of a rotor portion (not separately labeled) of turbine section 6 and the radial axis, e.g., between root section 42 and tip section 44. Thus, in accordance with an exemplary embodiment, first profile 60 is characterized by leading edge 44 and trailing edge 46 between root portion 42 and tip portion 44.

Figure 3:
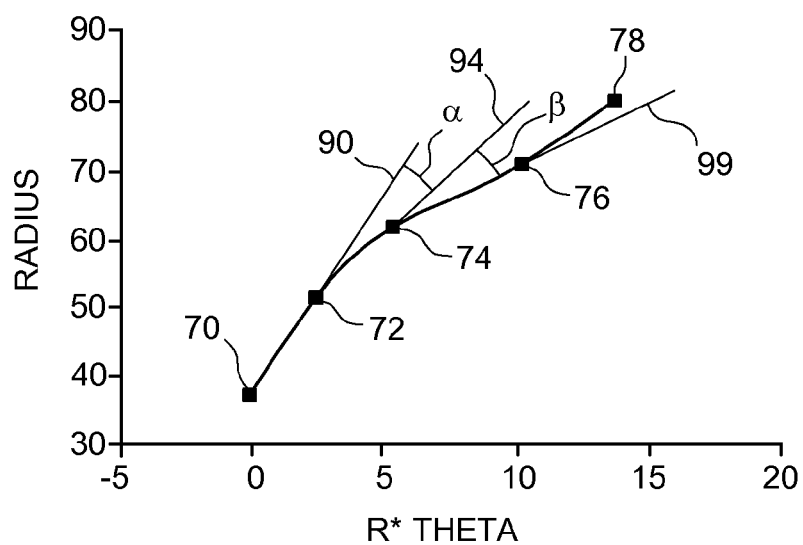
FIG. 3 is a graphical representation of an outer profile of the turbine nozzle of FIG. 2 taken along a trailing edge along a plane perpendicular to an axial axis of the turbine nozzle.

As best shown in FIG. 3, root portion 42 is shown at 70, a first position 72 is located between about 28% and about 38% from root portion 42, a second position 74 is located between about 53% and about 63% from root portion 42, a third position 76 is located between about 74% and about 84% from root portion 42, and tip portion 44 is shown at 78. In accordance with one aspect of the exemplary embodiment, first position 72 is located between about 30% and about 36% from root portion 42, second position 74 is located between about 55% and about 61% from root portion 42, and third position 76 is located between about 76% and about 82% from root portion 42. In accordance with another aspect of the exemplary embodiment, first position 72 is located about 33% from root portion 42, second position 74 is located about 58% from root portion 42, and third position 76 is located about 79% from root portion 42. At this point it should be understood that the use of the terms first, second, and third are for exemplary purposes only. The terms should not be considered to be limiting or represent a particular order, a particular preference, a particular ranking or the like.

In further accordance with the exemplary embodiment, first profile 60 includes an angle α of between about 3° and about 8° between a first line 90 passing through root end 44 shown as point 70 and first position 72 and a second line 94 passing through first position 72 and second position 74, and an angle β of between about 10° and about 20° between second line 94 and a third line 99 passing though second position 74 and third position 76. With this arrangement, first profile 60 establishes a lean distribution across turbine nozzle 12 resulting in a stage efficiency increase of approximately 0.35%. Such an improvement in stage efficiency, particularly at the last stage, provides an increased power output for turbomachines 2 at a significantly reduced cost. At this point it should be understood that while described in terms of first profile 60, second profile 62 could include similar geometry. That is, second profile 62 could be substantially identical to first profile 60. It should also be understood that the particular shape of first profile 60 and second profile 62 can also be utilized in connection with others of the plurality of turbine nozzles 10 and 11, or in connection with nozzles provided on a compressor (not shown).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A turbomachine comprising:
   a housing; and
   a plurality of turbomachine nozzles mounted within the housing, at least one of the plurality of turbomachine nozzles including a body having a first surface and an opposing second surface that extend between a first end and a second end, the first end and the second end defining a distance therebetween, at least one of the first and second surfaces including a profile having an angle of between about 3° and about 8° between a first line passing through the first end and a first position located between about 28% and about 38% of the distance from the first end and a second line passing through the first position and a second position located between about 53% and about 63% of the distance from the first end, and an angle of between about 10° and about 20° between the second line and a third line passing through the second position and a third position located between about 74% and about 84% of the distance from the first end.

2. The turbomachine according to claim 1, wherein the first position is located between about 30% and about 36% of the distance from the first end, the second position is located between about 55% and about 61% of the distance from the first end, and the third position is located between about 76% and about 82% of the distance from the first end.

3. The turbomachine according to claim 1, wherein the first position is located approximately 33% of the distance from the first end, the second position is located approximately 58% of the distance from the first end, and the third position is located approximately 79% of the distance from the first end.

4. The turbomachine according to claim 1, wherein the first surface is a suction side of the plurality of turbomachine nozzles and the second surface is a pressure side of the plurality of turbomachine nozzles.

5. The turbomachine according to claim 4, wherein the profile is provided on the first surface.

6. The turbomachine according to claim 4, wherein the profile is provided on the second surface.

7. The turbomachine according to claim 1, wherein the profile is provided on the first and second surfaces.

8. The turbomachine according to claim 1, wherein the plurality of turbomachine nozzles comprise a plurality of turbine nozzles.

9. The turbomachine according to claim 1, wherein the first end is a root end portion of the turbomachine nozzle and the second end is a tip portion of the turbomachine nozzle.

10. A turbomachine nozzle comprising:
    a body having a first surface and an opposing second surface that extend between a first end and a second end, the first end and the second end defining a distance therebetween, at least one of the first and second surfaces including a profile having an angle of between about 3° and about 8° between a first line passing through the first end and a first position located between about 28% and about 38% of the distance from the first end and a second line passing through the first position and a second position located between about 53% and about 63% of the distance from the first end, and an angle of between about 10° and about 20° between the second line and a third line passing through the second position and a third position located between about 74% and about 84% of the distance from the first end.

11. The turbomachine nozzle according to claim 10, wherein the first position is located between about 30% and about 36% of the distance from the first end, the second position is located between about 55% and about 61% of the distance from the first end, and the third position is located between about 76% and about 82% of the distance from the first end.

12. The turbomachine nozzle according to claim 10, wherein the first position is located approximately 33% of the distance from the first end, the second position is located approximately 58% of the distance from the first end, and the third position is located approximately 79% of the distance from the first end.

13. The turbomachine nozzle according to claim 11, wherein the first side is a suction side of the turbomachine nozzle and the second side is a pressure side of the turbomachine nozzle.

14. The turbomachine nozzle according to claim 13, wherein the profile is provided on the first surface.

15. The turbomachine nozzle according to claim 11, wherein the profile is provided on the second surface.

16. The turbomachine nozzle according to claim 10, wherein the profile is provided on the first and second surfaces.

17. The turbomachine nozzle according to claim 10, wherein the turbomachine nozzle is a turbine nozzle.

18. The turbomachine nozzle according to claim 10, wherein the first end is a root end portion of the turbomachine nozzle and the second end is a tip end portion of the turbomachine nozzle.

19. A method of forming a turbomachine nozzle, the method comprising:

creating a turbomachine nozzle having a first surface and an opposing second surface that extend between a first end and a second end, the first end and the second end defining a distance therebetween; and shaping one of the first and second surfaces to include a profile having an angle of between about 3° and about 8° between a line passing through the first end and a first position located between about 28% and about 38% of the distance from the first end and a second line passing through the first position and a second position located between about 53% and about 63% of the distance from the first end, and an angle of between about 10° and about 20° between the second line and a third line passing through the second position and a third position located between about 74% and about 84% of the distance from the first end.

20. The method of claim 19, further comprising: shaping both the first and second surfaces to include the profile.

* * * * *